(No Model.)
A. STEIN.
FURNACE.
No. 596,251.   Patented Dec. 28, 1897.
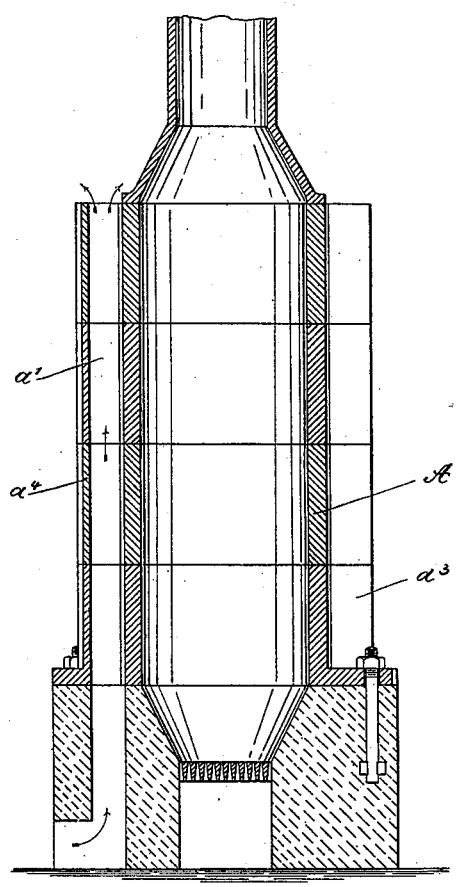
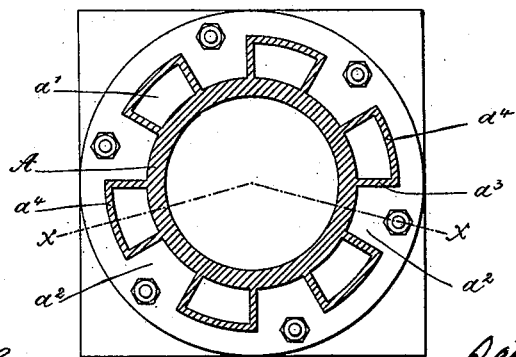
Witnesses:
Thomas M. Smith.
Richard C. Maxwell.
Inventor:
Albrecht Stein
By J. Walter Douglas
Attorney.

UNITED STATES PATENT OFFICE.

ALBRECHT STEIN, OF WETZLAR, GERMANY.

FURNACE.

SPECIFICATION forming part of Letters Patent No. 596,251, dated December 28, 1897.

Application filed December 24, 1896. Serial No. 616,831. (No model.) Patented in Luxemburg November 27, 1896, No. 2,673.

*To all whom it may concern:*

Be it known that I, ALBRECHT STEIN, a subject of the Emperor of Germany, residing at Wetzlar, in the Empire of Germany, have invented certain new and useful Improvements in Furnaces, (for which I have obtained Letters Patent of Luxemburg, No. 2,673, dated November 27, 1896,) of which the following is a specification.

My invention has relation to a furnace of that class or description known as a "smelting" or "roasting" furnace and designed for the burning of cement, lime, and the like, or for smelting ores; and in such connection it relates particularly to the construction and arrangement of such a furnace.

The principal objects of my invention are, first, to provide a furnace in which its interior wall or lining of iron or steel may be in direct contact with the material melted or burned without using a layer of any fireproof material, whereby great saving in cost of material and labor in the construction are effected, and, second, to provide a furnace in which the interior iron or steel wall or lining is not protected by fireproof material, but is surrounded or jacketed by numerous air passages or channels, through which a constantly-changing current of cool air is adapted to pass to cool the lining of the furnace and prevent its deterioration.

My invention consists of a furnace provided with air passages or channels so arranged that a series of closed channels or chambers project or radiate externally from the shell or casing and with open gutter-like passages disposed between said closed channels or chambers, so that the latter are alternately separated by an open channel, and the object of such arrangement is to create an unusually strong circulation of air.

The nature and scope of my invention will be more fully understood from the following description, taken in connection with the accompanying drawings, forming part thereof, in which—

Figure 1 is a longitudinal sectional view of a furnace embodying main features of my invention on the line *x x* of Fig. 2, and Fig. 2 is a cross-sectional view of said furnace.

Referring to the drawings, A represents the shell or casing of the furnace, which in the present invention consists of a tube of iron or steel having an unlined inner face in direct contact with the materials to be burned or smelted. From this shell or casing A a series of ribs $a^3$ project or radiate, which form the side walls of the chambers $a$ and channels $a^2$. The chambers $a'$ are encircled or jacketed by walls $a^4$, which are preferably arranged concentrically to the exterior casing or shell A' and curved in a corresponding or suitable manner. Air is admitted to the chambers $a'$ and channels $a^2$ from the lowermost or coolest portion of the furnace, and as it ascends it becomes more and more heated, thus creating a constant draft or suction through the channels. This cooling action is so great that, for example, temperatures may be produced in the interior of an iron furnace-shaft constructed in this manner which are far beyond the melting-point of iron without, however, the walls of the furnace being injuriously affected thereby.

Having thus described the nature and objects of my invention, what I claim as new, and desire to secure by Letters Patent, is—

The combination, in a roasting or smelting furnace, of an inner cylindrical metal casing having a series of radiating air-chambers extending therefrom and a complemental series of externally-exposed air channels or spaces between them, said air-chambers having inwardly-converging side walls and curved outer walls and each arranged independent of the other, substantially as and for the purposes described.

In witness whereof I have hereunto signed my name in the presence of two subscribing witnesses.

ALBRECHT STEIN.

Witnesses:
DEAN B. MASON,
JEAN GRUND.